United States Patent [19]

Yang

[11] Patent Number: 5,257,436
[45] Date of Patent: Nov. 2, 1993

[54] DUAL ACTION SELF-CLEANING WINDSHIELD WIPER

[76] Inventor: Ming-Tung Yang, No. 4-3, Lane 97, Lung Chuen Street, Taipei Hsien, Taiwan

[21] Appl. No.: 962,825

[22] Filed: Oct. 19, 1992

[51] Int. Cl.⁵ .............................. B60S 1/28; B60S 1/40
[52] U.S. Cl. ................... 15/250.40; 15/250.33; 15/250.41; 15/250.42
[58] Field of Search ........... 15/250.33, 250.42, 250.40, 15/250.41, 250.19, 250.23, 250.36

[56] References Cited

U.S. PATENT DOCUMENTS

| | | | |
|---|---|---|---|
| 2,025,888 | 12/1935 | Olivero | 15/250.40 |
| 3,009,185 | 11/1961 | Adams | 15/250.33 |
| 3,031,709 | 5/1962 | Easterling | 15/250.33 |
| 3,405,421 | 10/1968 | Tomlin | 15/250.33 |

FOREIGN PATENT DOCUMENTS

| | | | |
|---|---|---|---|
| 3142326 | 5/1983 | Fed. Rep. of Germany | 15/250.33 |
| 725492 | 3/1955 | United Kingdom | 15/250.33 |
| 2132077 | 7/1984 | United Kingdom | 15/250.41 |

*Primary Examiner*—Harvey C. Hornsby
*Assistant Examiner*—Gary K. Graham
*Attorney, Agent, or Firm*—Bacon & Thomas

[57] ABSTRACT

A dual action, self-cleaning windshield wiper having a pair of elongated brushes and a pair of wiper blades pivotally attached to a main blade frame. The elongated brushes are mounted on a brush mounting frame portion of supporting frames which pivot to enable a leading brush to contact and clean the windshield while at trailing brush is out of contact with the windshield. A wiper blade frame also pivots so that a leading wiper blade contacts the windshield while a trailing wiper blade contacts the trailing brush to clean the wiper blade.

2 Claims, 4 Drawing Sheets

DUAL ACTION SELF-CLEANING WINDSHIELD WIPER

BACKGROUND OF THE INVENTION

According to the traditional function of a windshield wiper, it is responsible for sweeping away rain falling on the windshield of a car, in order to maintain a clean windshield and keep good visibility. Owing to the developments of our times, we could live a materially exuberant life with high technology. However, it is also due to the developing technology that brings out the problems of pollution, among which air pollution is the most serious. Our air is so polluted by the industrial society that it is mixed with extremely heavy oil dirt or dust and sand, which not only damage our health, but also have serious influence over windshield wipers. When a windshield wiper operates in the polluted air, the dust and sand will damage the surface of the glass and the windshield wiper. Together with the oil and dirt, it is hard to maintain its function of sweeping and cleansing. This makes it impossible for the traditional wiper to maintain good visibility in the present industrial society and cause troubles for the consumers.

SUMMARY OF THE INVENTION

The design of the present windshield wiper is characterized by the fact that both the windshield of the car and the wiper itself are designed to incorporate an application of mechanical inertia operation, which enables the two wiper blades and brushes to sweep with two angles alternating in the sweeping operation of the windshield wiper. This maintains the cleanliness of the windshield, improving the visibility and the safety of driving.

DETAILED DESCRIPTION OF THE PREFERRED EMBODIMENT

Figure 1:
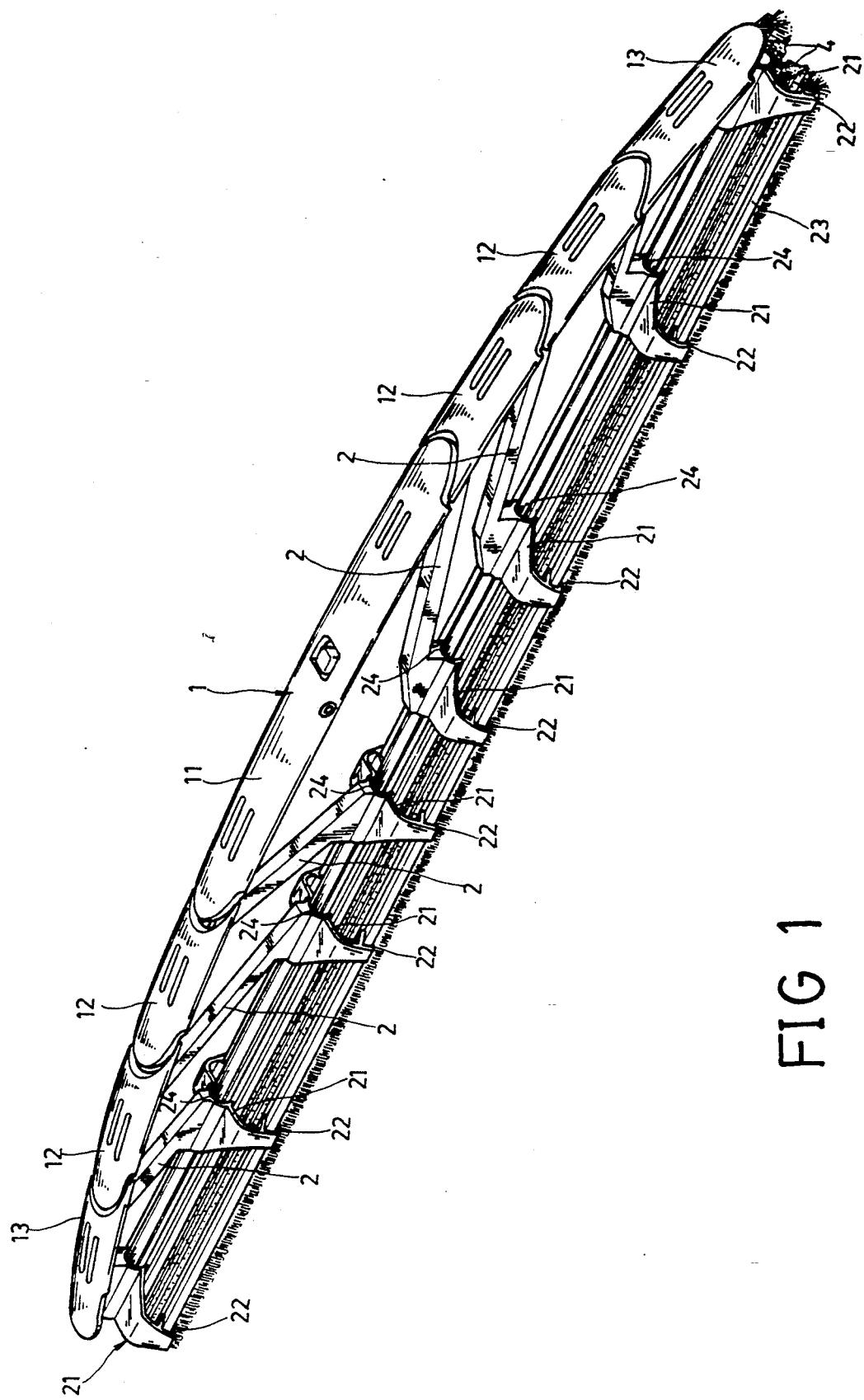
FIG. 1 is a perspective view of the windshield wiper according to the present invention.
Figure 2:
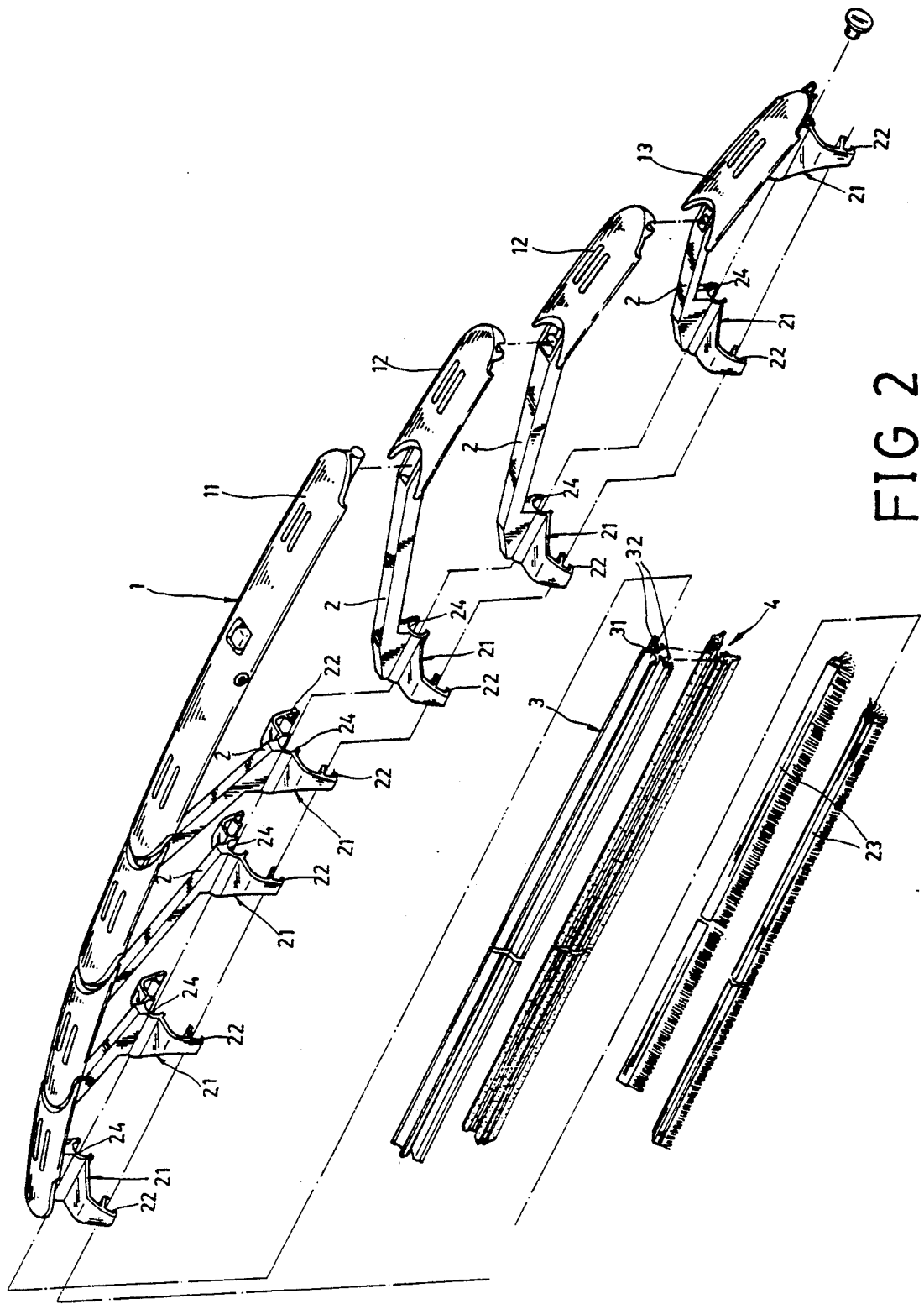
FIG. 2 is an exploded perspective view of the wiper shown in FIG. 1.
Figure 3:
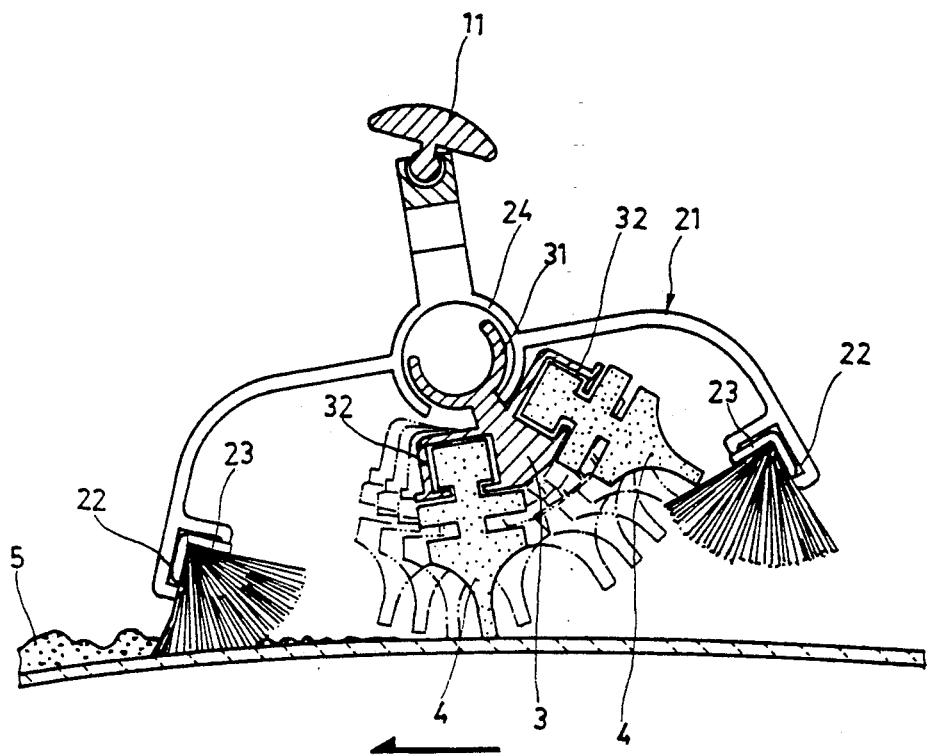
FIG. 3 is a cross-sectional view showing the wiper moving in one direction.
Figure 4:
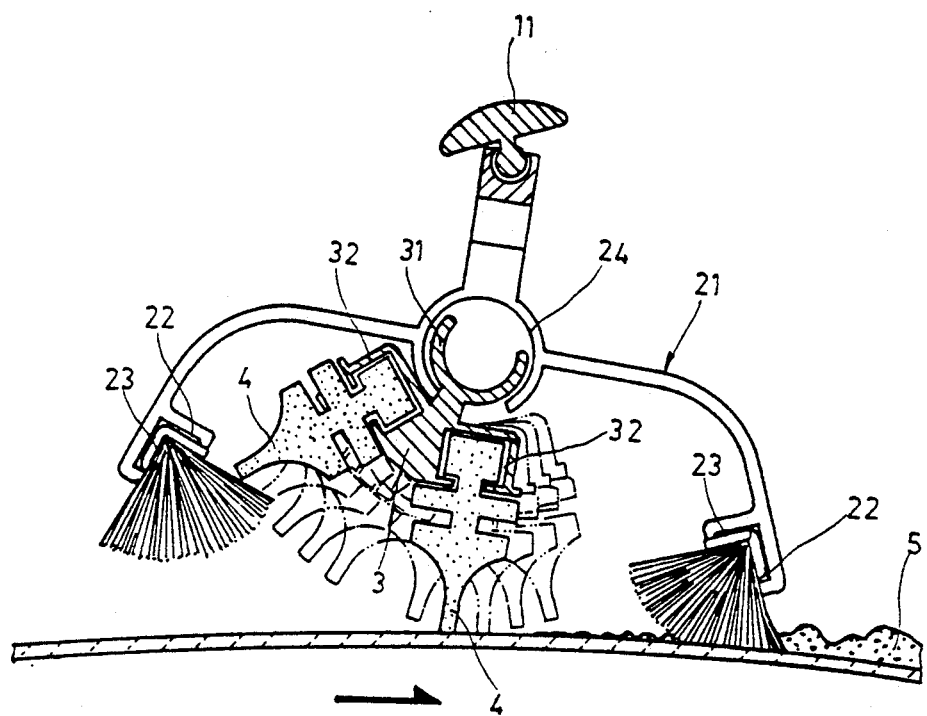
FIG. 4 is a cross-sectional view similar to FIG. 3 showing the wiper moving in an opposite direction.

Please refer to FIGS. 1 and 2. This creation is a cleansing windshield wiper with two angles alternating. The application of mechanical inertia action enables the windshield and the wiper to be designed with a new structure which sweeps and cleans. Its structure is composed of a main frame composed of divided parts (1) with several sets of supporting frames (2) and the wiper blade frame (3). The main frame (1) includes the middle frame (11) and multi-sided frames at both sides (12) as well as end frame (13). The middle frame (11) links itself with side frames (12) at both sides with cylindrical joints. This comprises the first level of angle change relationship among the middle frame (11) side frame (12), and end frame (13). The supporting frames (2) are mobile and inlayed in the bottom of side frames (12) and end frames (13). The bottom of its end is formed with several brush frames (21) with several claw-shaped clips (22), into which are inserted elongated brushes (23). The center of the bottom of the brush frame (21) formed a C-shaped, downwardly open groove (24), attaching a combination of the two wiper blades (4). Its upper design is a C-shape elongated portion (31), which is plugged into the C-shaped open groove (24) at the bottom of the several sets of brush frames (21) to form a double-way rolling axis. This comprises the second type of angle change relationship of this creation. At the bottom of the wiper blade frame (3) are two sets of clips (32), outstretched at a proper degree, into which two sets of wiper blades (4) are inserted. The orientation of the blades matches the angle of the double-way rolling axis formulated between the rolling axis of the combined elongated portion (31) and the open groove (24) of the brush frame (21). When the windshield wiper is applied to the windshield of the car and undergoes a sweeping operation as shown in FIG. 3, the whole structure, being motivated by the wiper arms (not shown), results in the axis turning a certain degree among middle (11), side (12) and end (13) frames owing to the mobile combination of the cylindrical joints. This phenomena also leads to an angle change in the brush frame (21) on the supporting frame (2) and enables the brush (23) to sweep away dust, sand or other dirt on the windshield of the car when the sweeping operation is initiated. At the same time, the wiper blade (4) at one side raises to touch the brush (23) at one side due to the running angle of the blade frame (3). In this way, the dirt on the wiper blade itself is cleared away to achieve a cleansing effect. When the arm of windshield wiper moves backwards, as shown in FIG. 4, blade frame (3) turns about its axis in an opposite direction. An additional angle change in the other direction tilts the brush frame (21) to make the elongated brush 23 of the clip in another end (22) sweep away the dust, sand and other dirt on the windshield on the way back from the first sweeping. There the first return sweeping operation in opposite direction is conducted. At the same time, the wiper blade under the other side of the brush frame is cleaned by the elongated brush at the leading side of brush frame in the last sweeping operation. Now, the second sweeping operation on the way back is conducted by a clean wiper blade by way of returning angle, vertical to the windshield. In this process, the wiper blade, polluted in the first sweeping operation raises to touch the elongated brush at the side of the brush frame at the same side due to the change of the angle and is cleaned. That is, this creation enables the sweep wiper blade to automatically clean the windshield and the wiper blade itself in the operation through the relationship of two alternating angles. So, it maintains the cleanest effect on the windshield and improves the safety in driving with good visibility. It is also effective in snowy and rainy seasons or in the desert. This creation reduces the possibility of the windshield wiper being polluted and damaged.

The major purpose of this creation, therefore, aims at proposing a cleansing windshield wiper. With simple and fine design, the wiper effectively maintains the clean lines of the windshield and the wiper itself.

The major purpose of this invention is to enable the sweeping operation to be endowed with the double function of both sweeping of the brush and the cleansing of the wiper blade. The sweeping operation cleans simultaneously the wiper blade of the another side and therefore lengthens the life of the wiper as well as maintaining the best condition of sweeping.

I claim:

1. A dual action, self-cleaning windshield wiper assembly for cleaning a vehicle windshield by oscillating movement over said windshield, said assembly comprising:
   (a) an elongated main windshield wiper frame;
   (b) a plurality of supporting frames extending from the elongated main windshield wiper frame, each supporting frame defining a generally "C"-shaped groove and having brush mounting frames extending therefrom on opposite sides of the generally "C"-shaped groove, each brush mounting frame having a brush mounting clip;
   (c) elongated brushes mounted in the brush mounting clips such that an elongated brush is disposed on each side of the generally "C"-shaped groove;
   (d) first attaching means pivotally attaching the supporting frames to the main frame such that, as the windshield wiper assembly moves over the windshield, the supporting frames pivot with respect to said main frame such that a leading brush contacts the windshield while a trailing brush is out of contact with the windshield; and
   (e) an elongated wiper blade frame having a pair of elongated wiper blades mounted in lateral spaced relation thereon, said wiper blade frame pivotally mounted in the generally "C"-shaped grooves so as to pivot with respect to the brush mounting frames such that as the wiper assembly moves over the windshield, a leading wiper blade contacts the windshield and a trailing wiper blade contacts the trailing elongated brush so as to clean the trailing wiper blade.

2. The dual action, self-cleaning windshield wiper assembly of claim 1 wherein the elongated main windshield wiper frame comprises:
   a) a middle frame having opposite ends;
   b) at least one side frame attached to each opposite end of the middle frame, each side frame having a supporting frame extending therefrom; and,
   c) an end frame pivotally attached to one end of the at least one side frame on each opposite end of the main frame, each such end frame having a supporting frame extending therefrom.

* * * * *